D. EBERLY.
Grain-Drill.
No. 7,698.
Patented Oct. 8. 1850.
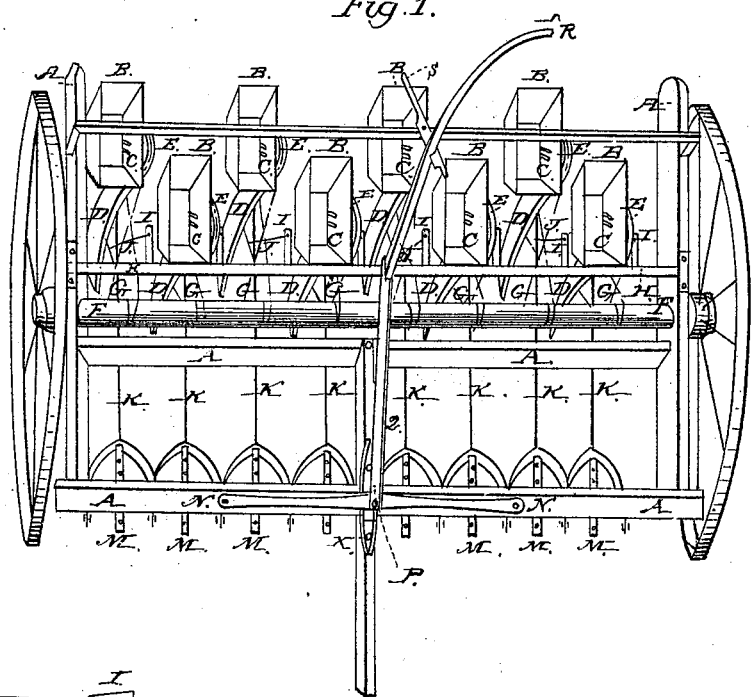
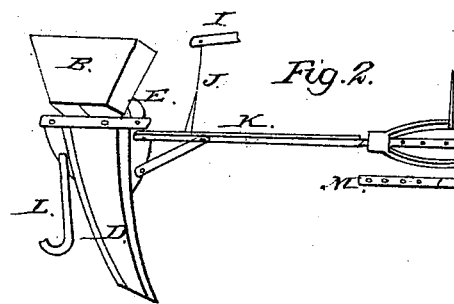
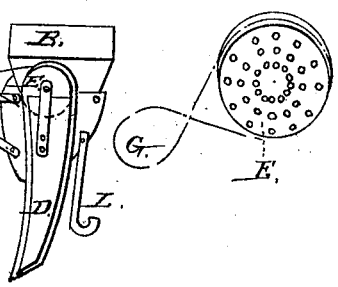

UNITED STATES PATENT OFFICE.

D. EBERLY, OF STRASBURG, PENNSYLVANIA.

IMPROVEMENT IN SEED-PLANTERS.

Specification forming part of Letters Patent No. 7,698, dated October 8, 1850.

*To all whom it may concern:*

Be it known that I, DAVID EBERLY, of Strasburg borough, in the county of Lancaster and State of Pennsylvania, have invented a new and Improved Grain-Drill; and I do hereby declare that the following is a full and exact description thereof, reference being had to the accompanying drawing, and to the letters of reference marked thereon, making a part of this specification.

The nature of my invention and improvement is the attaching of the hoppers (with pulleys at the sides having thirty-six cup-holes as sowers) to the top of the shovels, and by an endless cord or rope around the pulleys and the axle of the carriage the shovels, hoppers, &c., are drawn along and the seeding is regulated, and having a lever, bar, and slider attached to the double-tree the shovels are raised simultaneously and the feed stopped whenever required by the pulling of the horses.

This machine I have tested. It works admirably, and is so simple in its construction that its cost will be one-half less than the usual price of grain-drills now in use.

To enable others skilled in the art to make and use my invention, I will proceed to describe its construction and operation.

A is the frame-work, with carriage-wheels; B, the eight hoppers, with two or more apertures, C, through which the grain passes, the quantity of seed being regulated by closing all the holes but one, through which the seed passes to either of the circles of holes in the pulley E. The hoppers are attached to the top of the shovels D by a cast-iron plate.

E is the pulley at the side of the hopper, having thirty-six cup-holes or sowers arranged in three circles (twelve in each circle) to regulate the quantity of grain to be sown by diverting the seed into either series, the inside cup-holes (the smaller) to sow a bushel and a peck of grain; the next range of cup-holes (the larger) to sow a bushel and a half; and the third and outside range of cup-holes to sow a bushel and three pecks. The pulley E operates on two journals, resting on each side of a cast-iron plate on top of shovel D.

Around each pulley and the axle F is an endless rope, G, by which, by the revolution of the axle F, the pulley is revolved and the grain is allowed to pass through the shovels D.

H is a roller resting at each end on the frame-work, to which eight projections or pins, I, are attached, to which a rope, J, is fastened, extending to the draft-irons K, for the purpose of raising the shovels simultaneously. M, the front end of the draft-irons, are formed and operate as a slide to tighten the rope G, a pin being put through one of the holes in the end to hold the hopper in case of one of the cords breaking. By this arrangement the bands which drive the seeding-pulleys E are always kept tightly stretched and the continuous revolution of the pulleys insured while the shovels are acting on the ground, and the troublesome necessity of adjusting the bands as they become stretched by use is obviated.

N is the double-tree, to which the horses are attached, working upon a slide, O, operating on each side of two bolts running into the tongue of the carriage. A third and center-bolt, P, passes through the double-tree and screws into the center of the slide O.

From the bolt P an iron bar extends back to the lever R, fastened to roller H, and by the draft of the horses the double-tree, bar Q, and lever R are drawn or slide forward, and thus the shovels are raised simultaneously and the seeding is stopped, and when the machine is again to sow the lever R is drawn back and held by the catch S, fastened to frame-work.

The weight of all the shovels, hoppers, &c., being considerable, it is a manifest advantage to have them lifted by the draft of the horses at a time when the operator's hands are engaged in guiding the horses and turning the machine, and the construction is such as to slacken the bands at the same time the shovels are lifted from the ground.

What I claim, and desire to secure by Letters Patent, is—

1. The sliding link X, in combination with the lever R and catch S, for working the seeding apparatus by the draft of the team, as set forth.

2. Stopping the feeding by slackening the bands, and the simultaneous elvation of the shovels by the draft of the team, substantially as set forth.

DAVID EBERLY.

Witnesses:
ZURIEL SWOPE,
J. FRANKLIN REIGART.